US012164576B2

(12) United States Patent
Gout et al.

(10) Patent No.: US 12,164,576 B2
(45) Date of Patent: *Dec. 10, 2024

(54) DATA SET INVENTORY AND TRUST SCORE DETERMINATION

(71) Applicant: Talend SAS, Suresnes (FR)

(72) Inventors: Chloë Gout, Loire-Atlantique (FR); Van Hai Nguyen, Loire-Atlantique (FR); Gwendal Vaz Nunes, Loire-Atlantique (FR); Thomas Pocreau, Loire-Atlantique (FR); Wesley Ruchaud, Loire-Atlantique (FR); Sebastiao Correia, Suresnes (FR); Raphael Nedellec, Nantes (FR)

(73) Assignee: Talend SAS, Suresnes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,365

(22) Filed: Apr. 12, 2022

(65) Prior Publication Data
US 2022/0245197 A1    Aug. 4, 2022

Related U.S. Application Data

(63) Continuation of application No. 17/019,051, filed on Sep. 11, 2020, now Pat. No. 11,314,818.

(51) Int. Cl.
*G06F 16/907*        (2019.01)
*G06F 16/215*        (2019.01)
(Continued)

(52) U.S. Cl.
CPC ...... *G06F 16/907* (2019.01); *G06F 16/90348* (2019.01); *G06F 16/906* (2019.01); *G06Q 10/101* (2013.01)

(58) Field of Classification Search
CPC ............. G06F 16/907; G06F 16/90348; G06F 16/906; G06F 16/215; G06F 16/9538; G06Q 10/101
See application file for complete search history.

(56) References Cited

U.S. PATENT DOCUMENTS 7,805,518 B1 *   9/2010   Kamvar ................ H04L 67/104
                                                             709/227
7,822,631 B1 *  10/2010   Vander Mey .... G06Q 10/06395
                                                             705/7.41
(Continued)

*Primary Examiner* — Dennis Truong
(74) *Attorney, Agent, or Firm* — Ballard Spahr LLP

(57) ABSTRACT

Methods, systems, and apparatus, including computer programs encoded on computer storage media for a Trust Score Engine are directed to providing a user interface for identifying datasets collected into a dataset inventory wherein the dataset inventory may be displayed within the user interface. The Trust Score Engine determines social curation activities by respective user accounts that have been applied the datasets in the dataset inventory and validates the datasets in the dataset inventory according to pre-defined attributes applied to any of the respective datasets. The Trust Score Engine generates a first trust score for a first dataset according to any determined social curation activities and any pre-defined attributes that correspond to the first dataset. The Trust Score Engine receives a selection of a trust score visualization functionality, via the user interface, with respect to the first dataset.

21 Claims, 14 Drawing Sheets

System Diagram

(51) Int. Cl.
  *G06F 16/903*   (2019.01)
  *G06F 16/906*   (2019.01)
  *G06Q 10/101*   (2023.01)

(56) References Cited

U.S. PATENT DOCUMENTS

| | | | | |
|---|---|---|---|---|
| 8,515,863 B1* | 8/2013 | Morejon | ................ | G06Q 40/02 |
| | | | | 705/38 |
| 11,157,954 B1* | 10/2021 | Belanger | ............ | G06Q 30/0201 |
| 2005/0060297 A1* | 3/2005 | Najork | ................ | G06F 16/951 |
| 2005/0256866 A1* | 11/2005 | Lu | ....................... | G06F 16/9535 |
| | | | | 707/999.005 |
| 2006/0020614 A1* | 1/2006 | Kolawa | ................ | G06Q 30/02 |
| 2006/0173924 A1* | 8/2006 | Wotton | ................. | G06F 16/20 |
| 2007/0174385 A1* | 7/2007 | DuFour | ................ | G06Q 30/06 |
| | | | | 709/203 |
| 2008/0005064 A1* | 1/2008 | Sarukkai | ............. | G06F 16/957 |
| 2009/0182780 A1* | 7/2009 | Wong | ................. | G06F 16/25 |
| 2009/0210244 A1* | 8/2009 | Koister | ................. | G06Q 30/02 |
| | | | | 705/319 |
| 2010/0106558 A1* | 4/2010 | Li | ......................... | G06Q 10/06 |
| | | | | 705/317 |
| 2012/0284090 A1* | 11/2012 | Marins | ............... | G06Q 10/0631 |
| | | | | 705/7.39 |
| 2013/0031044 A1* | 1/2013 | Miranda | ................ | G06N 20/00 |
| | | | | 706/47 |
| 2013/0080197 A1* | 3/2013 | Kung | .................... | G06Q 10/10 |
| | | | | 707/E17.084 |
| 2013/0110732 A1* | 5/2013 | Uppal | ................. | G06Q 10/0635 |
| | | | | 705/319 |
| 2013/0166515 A1* | 6/2013 | Kung | ................... | G06Q 10/063 |
| | | | | 707/690 |
| 2014/0229456 A1* | 8/2014 | Hollifield | ............ | G06F 16/2365 |
| | | | | 707/697 |
| 2014/0258305 A1* | 9/2014 | Kapadia | ................. | H04W 4/21 |
| | | | | 707/741 |
| 2014/0317126 A1* | 10/2014 | Work | ..................... | H04L 51/52 |
| | | | | 707/748 |
| 2015/0127660 A1* | 5/2015 | Zilberberg | ............ | G06F 16/254 |
| | | | | 707/748 |
| 2016/0070725 A1* | 3/2016 | Marrelli | ............ | G06F 16/24578 |
| | | | | 707/692 |
| 2016/0277424 A1* | 9/2016 | Mawji | .................... | G06Q 50/01 |
| 2017/0103101 A1* | 4/2017 | Mason | ................ | G06F 16/2365 |
| 2017/0134366 A1* | 5/2017 | Genner | ................. | H04L 63/083 |
| 2017/0294010 A1* | 10/2017 | Shen | ..................... | G06F 18/214 |
| 2018/0173733 A1* | 6/2018 | Nath | ..................... | G06F 16/48 |
| 2019/0065686 A1* | 2/2019 | Crane | ................... | G16H 10/60 |
| 2019/0109871 A1* | 4/2019 | Vickrey | .............. | H04L 63/1433 |
| 2019/0286621 A1* | 9/2019 | Hall | ...................... | G06F 16/215 |
| 2019/0332294 A1* | 10/2019 | Kilari | ................... | G06F 3/0671 |
| 2019/0362452 A1* | 11/2019 | Brunets | ................ | H04M 15/66 |
| 2019/0370233 A1* | 12/2019 | Yamashita | ............ | G06F 16/254 |
| 2020/0162354 A1* | 5/2020 | Drees | .................... | G05B 15/02 |
| 2020/0285623 A1* | 9/2020 | Schuetz | ................ | G06F 16/215 |
| 2020/0302122 A1* | 9/2020 | Lai | ........................ | G06F 16/288 |
| 2021/0117394 A1* | 4/2021 | Moresmau | ........... | G06F 16/215 |
| 2021/0271963 A1* | 9/2021 | Amisano | ............... | H04L 9/0643 |
| 2021/0319027 A1* | 10/2021 | Goel | ................... | G06F 16/254 |
| 2021/0357706 A1* | 11/2021 | Chidambaram | ........ | G06F 18/23 |

* cited by examiner

600
Data Trust Score Determination

Provide a user interface for identifying multiple, independent datasets collected into a dataset inventory, the dataset inventory for display within the user interface — 610

Determining social curation activities by respective user accounts that have been applied to one or more of the datasets in the dataset inventory — 620

Validate one or more of the datasets in the dataset inventory according to one or more pre-defined attributes applied to one or more respective datasets — 630

Generate a first trust score for a first dataset according to any determined social curation activities and any pre-defined attributes that correspond to the first dataset — 640

Receive a selection of a trust score visualization functionality, via the user interface, with respect to the first dataset, the trust score visualization functionality to trigger generating a visualization of an extent that any determined social curation activities and any pre-defined attributes that correspond to the first dataset effect a value of the first trust score — 650

FIG. 6

DATA SET INVENTORY AND TRUST SCORE DETERMINATION

CROSS-REFERENCE TO RELATED APPLICATIONS

This application is a continuation of U.S. application Ser. No. 17/019,051, filed Sep. 11, 2020, which is hereby incorporated by reference in its entirety.

BACKGROUND

Over the past many years, the number of datasets that an organization uses has grown and increased significantly. These datasets include collections of different types and sources of information which are used by various systems and applications. These datasets may be found in several forms, such as databases, data files, spreadsheets, text and binary files, transaction records, image collections, application specific file types and other unique data collections. As the number of these datasets has grown dramatically, searching for and using these distributed datasets has become increasing complex and inefficient.

Often times different groups within an organization will create datasets which tend to be siloed and are not made accessible to other users within the organization. This lack of visibility of these datasets to others in the organization cause the particular dataset to be underutilized by different users. For example, a particular dataset otherwise could have been leveraged and may have been of some value to another part of the organization only if the particular dataset had been known to exist.

Also, as these datasets grow in number, not only managing or cataloging of these datasets is difficult and inefficient, but also understanding the qualitative nature and the social reliance by multiple users is unknown. A need therefore exists for a system and method for allowing users to create a data inventory of distributed datasets, and for providing a meaningful indication of the quality and the reliance and evaluation by users of the datasets.

SUMMARY

Described herein is an innovative system and methods directed to a Trust Score Engine for creating data inventories of multiple datasets. The Trust Score Engine determines trust scores for the datasets based on multiple criteria that considers dataset data quality, annotation and aggregate social evaluation by users of the datasets. For example, the Trust Score Engine may evaluate the data quality of a dataset by evaluating data completeness and data validity. As to social evaluation, the Trust Score Engine may assess dataset usage, social curation by users and discoverability of a dataset.

Various advantages and improvements over conventional systems are provided by the Trust Score Engine, which includes automatic creation (and continuous update) of a data inventory of disparate and unrelated, multiple datasets (i.e., managed data assets) that are accessible by a plurality of user accounts within a common organization. The Trust Score Engine provides a user interface that acts as an accessible single point of intelligence for the user accounts to view attributes and characteristics of the datasets. The Trust Score Engine automates a data intelligence score, such as the trust score, across data pipelines and reduces the amount of time required for a user account to search for, identify and utilize data stored in the respective datasets listed in the dataset inventory.

Various embodiments of the Trust Score Engine are directed to providing a user interface for identifying multiple, datasets collected into a dataset inventory where the dataset inventory may be displayed within the user interface. The Trust Score Engine determines social curation activities by respective user accounts that have been applied to one or more of the datasets in the dataset inventory and validates one or more of the datasets in the dataset inventory according to one or more pre-defined attributes applied to one or more respective datasets. The Trust Score Engine generates a first trust score for a first dataset according to any determined social curation activities and any pre-defined attributes that correspond to the first dataset. The Trust Score Engine receives a selection of a trust score visualization functionality, via the user interface, with respect to the first dataset. For example, the trust score visualization functionality triggers generation of a visualization of an extent that any determined social curation activities and any pre-defined attributes that correspond to the first dataset effect a value of the first trust score. It is understood that the Trust Score Engine may generate a trust score for each dataset in the dataset inventory or a subgroup of datasets in the dataset inventory.

The dataset trust score provides users visual and quantitative information to allow the user to assess and easily understand those datasets in the data inventory having higher trust as compared to those datasets having a lower value of trust. According to various embodiments, The Trust Score Engine provides user interfaces allowing a user to view a list of datasets included in a dataset inventory where a user interface may include a display of a selectable trust score functionality such as, for example, a selectable trust score visualization functionality.

According to various embodiments, a trust score value for a dataset may be based on a plurality of weighted categories, such as dataset popularity, dataset completeness, dataset validity, dataset discoverability and dataset usage. A trust score visualization based on the trust score may include a visual characteristic that represents an effect of each weighted category on the value of the trust score. For example, if the dataset popularity category corresponds to characteristics and attributes of a dataset that have a significant effect on the trust score value as compared to other weighted categories, a visual characteristic of the trust score visualization may represent the dataset popularity category in a manner that visually communicates the effect of the dataset popularity category on the current value of the trust score.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 6 illustrates an example process for data trust score determination.

DETAILED DESCRIPTION

Figure 1:
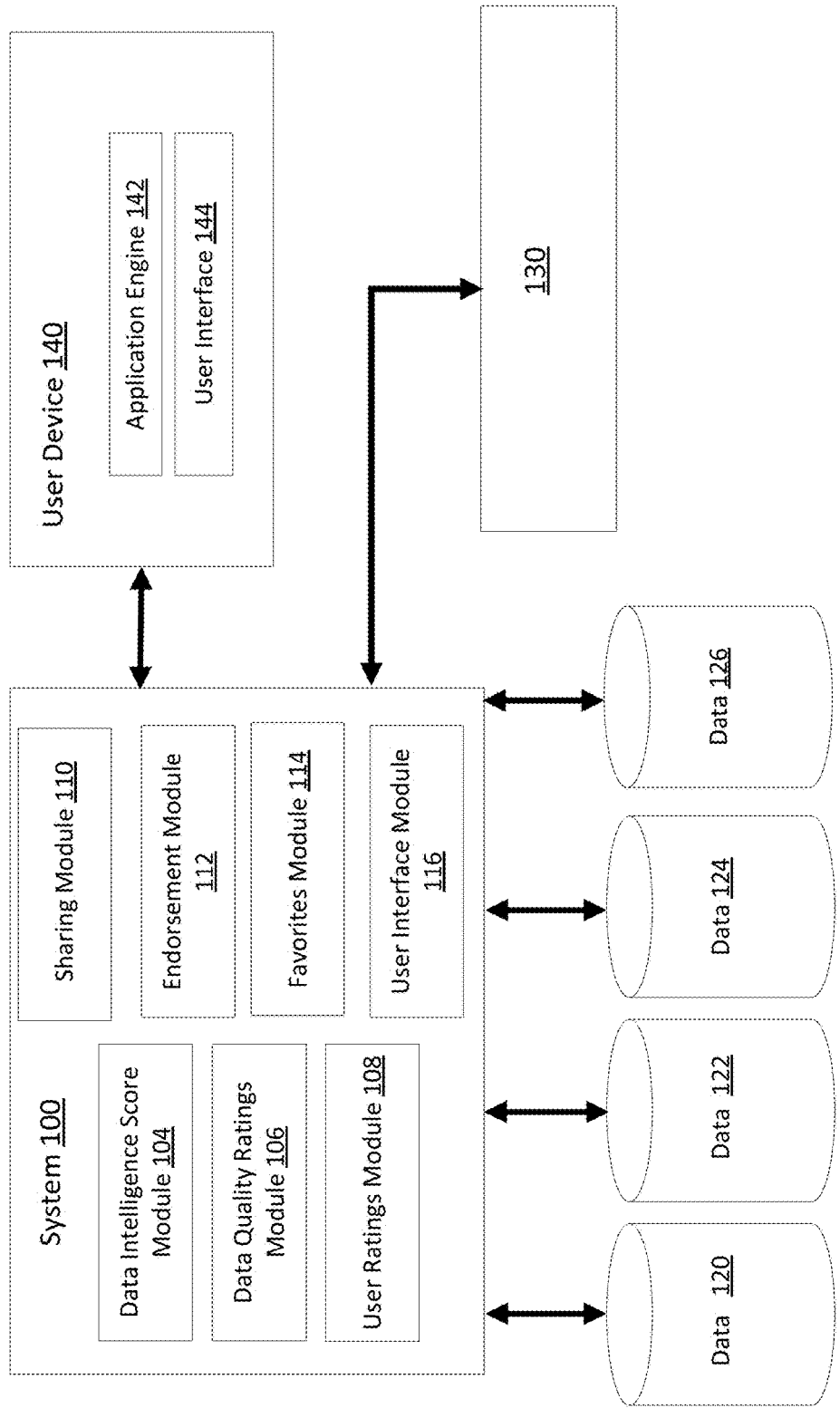
FIG. 1 illustrates a diagram of an example system utilized in data trust score determination.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates a block diagram of an example system 100 for a Trust Score Engine. The system 100 may include a Data Intelligence Score Module 104, a Data Quality Ratings Module 106, a User Ratings Module 108, a Sharing Module 110, an Endorsement Module 112, a Favorites Module 114 and a User Interface Module 116.

While the databases 120, 122, 124, 126 are displayed separately, the databases and information maintained in a database 120, 122, 124, 126 may be combined together or further separated in a manner that promotes retrieval and storage efficiency and/or data security.

The Data Intelligence Score Module 104 may perform functionality related to determining a trust score(s) as described herein.

The Data Quality Ratings Module 106 may perform functionality related to determining a trust score(s) as described herein.

The User Ratings Module 108 may perform functionality related to social curation as described herein.

The Sharing Module 110 may perform functionality related to social curation as described herein.

The Favorites Module 114 may perform functionality related to a dataset(s) labeled as a favorite dataset as described herein.

The User Interface Module 116 may perform functionality related to rendering and display of information as described herein.

The User Device 140 may have an Application Engine 142 and a User Interface 144. It is understood that the system 100 may further include one or more additional modules for performing, or supporting performance of, any operation(s), step(s), act(s), instruction(s) and process(es) described herein.

Process Overview

Figure 2:
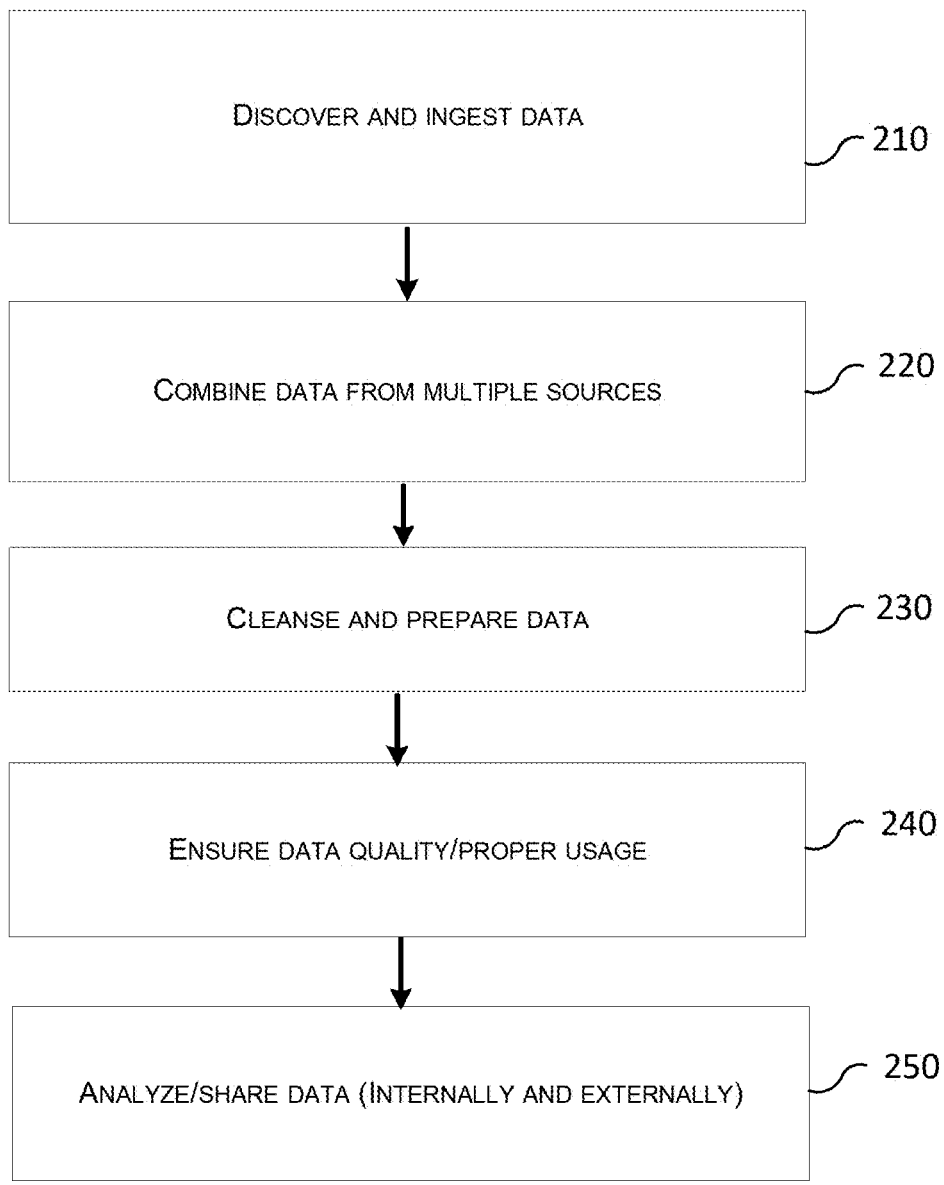
FIG. 2 illustrates an example of an overview of a process for data trust score determination.

FIG. 2 illustrates an example flowchart 200 for an overview of a process for data trust score determination. The Trust Score Engine discovers and ingests data (Act 210). For example, the Trust Score Engine may identify raw data at various locations of datasets (i.e. data sources), where each dataset is accessible by at least a portion of user accounts that share a user account domain or are part of a common organization or project. The various datasets may be siloed data in that some of the datasets are not connected to each other—or dependent from each other. A first dataset may have different types of data formats and data types than a second dataset and may further have different policies and access controls. The Trust Score Engine combines data from multiple sources (Act 220). The Trust Score Engine aggregates the datasets into a defined collection of datasets. The Trust Score Engine cleanses and prepares the data in the collection of datasets (Act 230). For example, the Trust Score Engine may identify null values and errors in the datasets. The Trust Score Engine may identify datasets that have incompatible data types and reformat the data. The Trust Score Engine ensures the quality of the dataset and proper usage of the dataset (Act 240) and further analyzes and shares the datasets (Act 250).

Dataset List View—Summary User Interface

Figure 3:
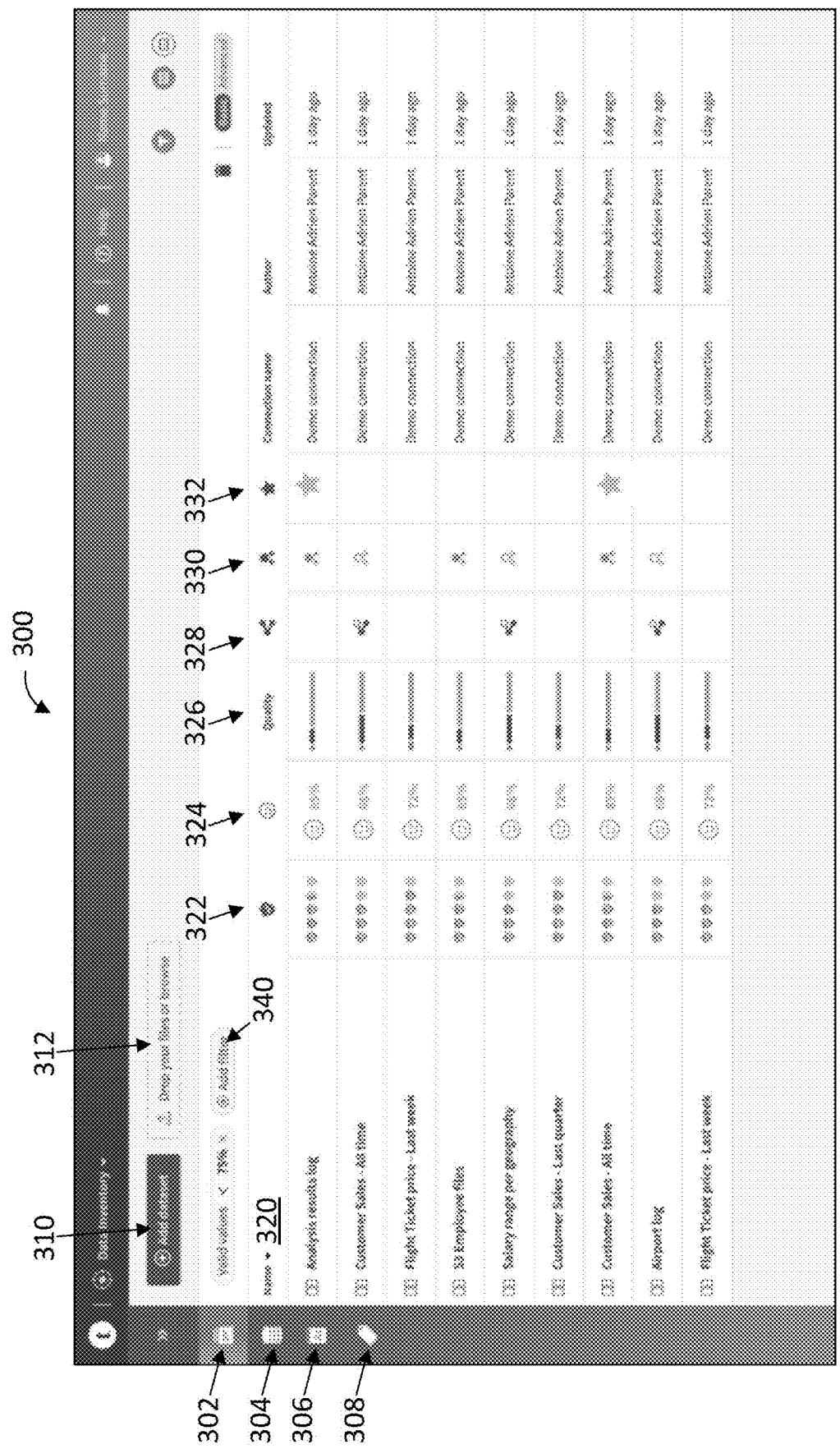
FIG. 3 illustrates an example user interface according to one embodiment of the present disclosure.

FIG. 3 illustrates an example user interface 300 of the Trust Score Engine according to one embodiment of the present disclosure. The Trust Score Engine may generate a user interface 300 that depicts a list view of datasets. The user interface 300 may receive input or selections from a user account of various icons, graphical user interface controls, text and or other selections about the user interface 300. The user interface 300 includes control icons for Datasets 302, Connections 304, Semantic Types 306 and Custom Attributes 308. In response to receiving a user input or selection of the control icon Datasets 302, the Trust Score Engine displays the user interface 300 depicted in FIG. 3. In response to receiving a user input or selection of the control icon 304 (i.e., Connections), the Trust Score Engine displays the user interface depicted in FIG. 4A. In response to receiving a user input or selection of the control icon 306 (i.e., Semantic Types), the Trust Score Engine displays the user interface depicted in FIG. 4D. In response to the receiving a user input or selection of the control icon 308 (i.e., Custom Attributes), the Trust Score Engine displays the user interface depicted in FIG. 4E.

The dataset list view user interface 300 depicts information organized in a columnar manner, describing aspects of datasets. The information displayed about listed datasets includes a name of the dataset 320, a dataset trust score 322, a dataset average user rating 324, a dataset quality rating 326, a dataset sharing attribute 328 (such as a sharing policy), an indication of dataset certification by a respective user account 330, an indication of the whether the dataset is a favorite of a user(s) 332, the name and/or id of the author that created the dataset, and information about when the dataset was last updated.

The determination of the trust score value 322 will be further described herein. The trust score 322 may be represented by a graphical indication and/or a numeric value indicating the trust score. In the example, the trust score 322 is represented by a series of icons (e.g., shields) on a scale of 0 to 5 indicating the value of the trust score.

The listing of the datasets may be filtered or searched via the add filter user control 340. In response to receiving a user input or selection of the add filter user control 340, the Trust Score Engine displays the user interface depicted in FIG. 4F. Adding a filter will cause the Trust Score Engine to only present datasets in the list view that meet the criteria of the filter. Some criteria on which datasets may be filtered and retrieved include the connection name, the connection type, custom attributes, dataset name, description, tags, value types (such as valid, invalid or empty), trust score value (such as a particular value or a range of values) and/or trust score category values or range of values (such as values for Validity, Popularity, Completeness, usage and/or Discoverability categories). For example, the user interface 300 may receive a selection of a particular displayed dataset in the dataset list, and in response to the selection (e.g., receiving a mouse double click command, or a double tap via a touch device), the Trust Score Engine displays a detail view of the selected dataset as depicted in the user interface of FIG. 5.

Data Connection User Interface

Figure 4A:
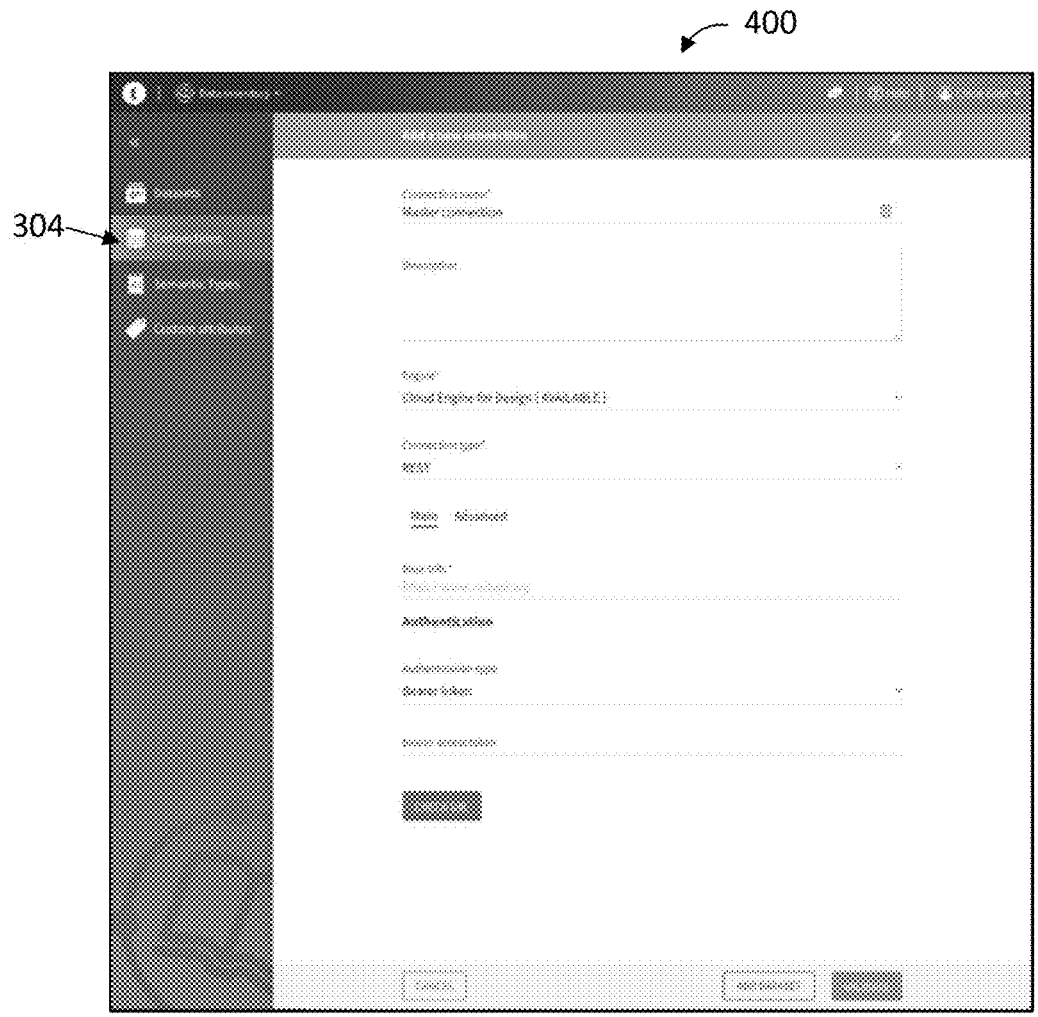
FIG. 4A illustrates an example user interface according to one embodiment of the present disclosure.
Figure 4B:
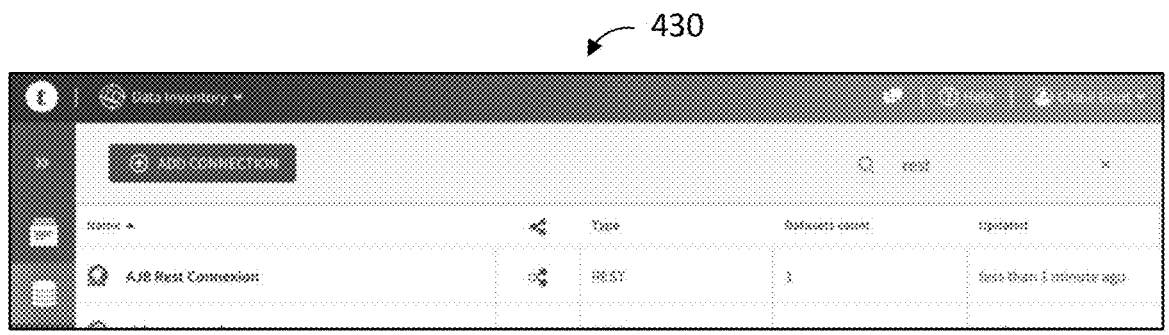
FIG. 4B illustrates an example user interface according to one embodiment of the present disclosure.
Figure 4C:
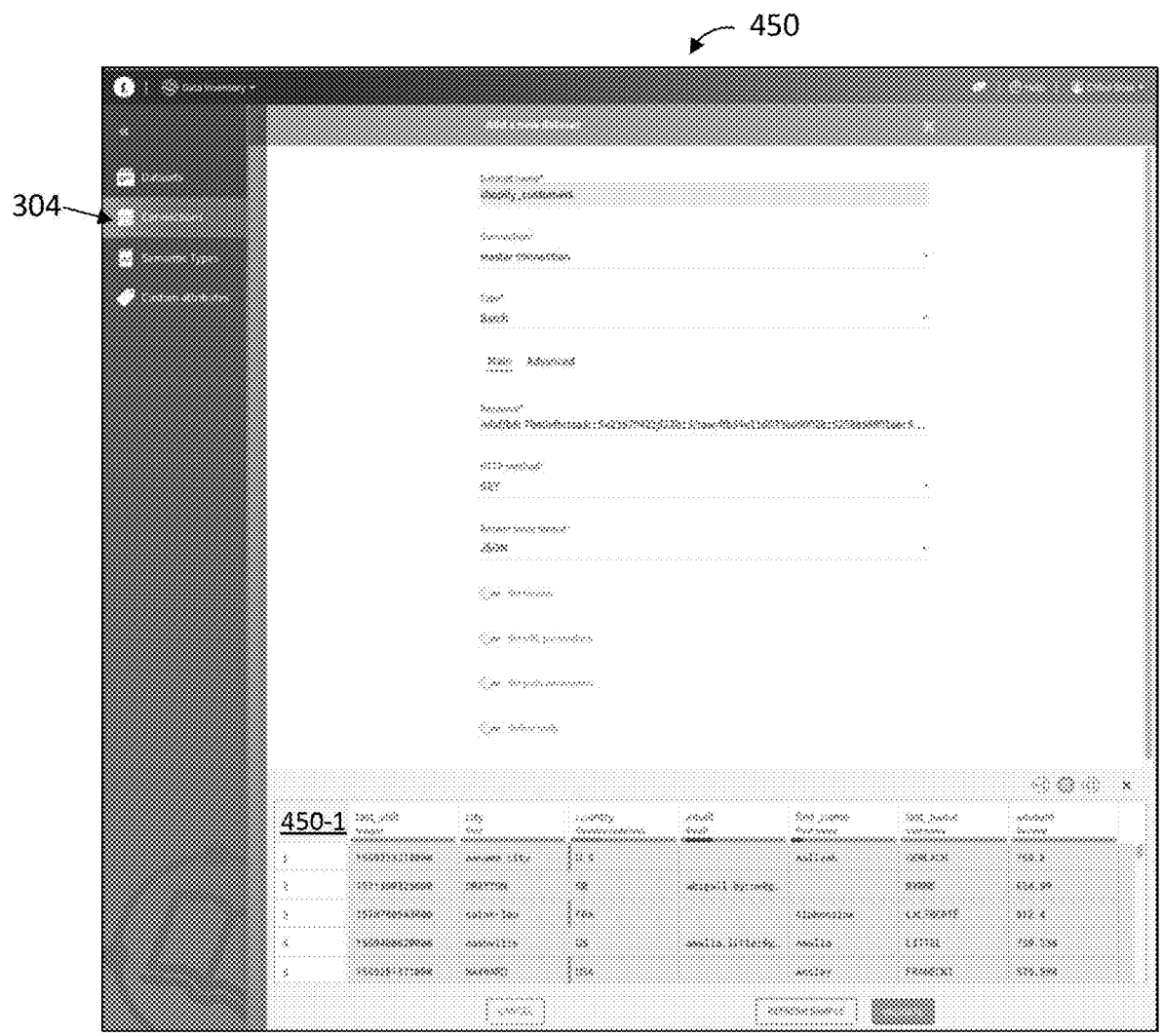
FIG. 4C illustrates an example user interface according to one embodiment of the present disclosure.

FIGS. 4A-4C illustrate example user interfaces 400, 430, 450 according to embodiments of the present disclosure. A user interface 400 as shown in FIG. 4A may provide selectable functionality for adding a new connection to a dataset(s) and/or editing a connection(s). In some embodiments, a user may be associated with a user account granted a particular type of permission level and/or authorization for adding and/or editing a connection(s). A user interface 430 as shown in FIG. 4B may display a list of types of connections that have been added. The user interface 400 may provide for receipt of user input and/or the display of the connection name, a description of the connection, the connection type, the type of authentication of the connection, and other information. A user interface 400-1 for adding a dataset 450 as shown in FIG. 4C may include a preview portion 450-1 that provides a view of the added dataset and its one or more data values and data types. According to various embodiments, the user interface 400-1 for adding a dataset may be accessed directly from the user interface 400 for creating dataset connections. The user interface 450 may provide for user input and/or display of the dataset name, the connection name, the type of connection, and other information.

Semantic Type User Interface

Figure 4D:
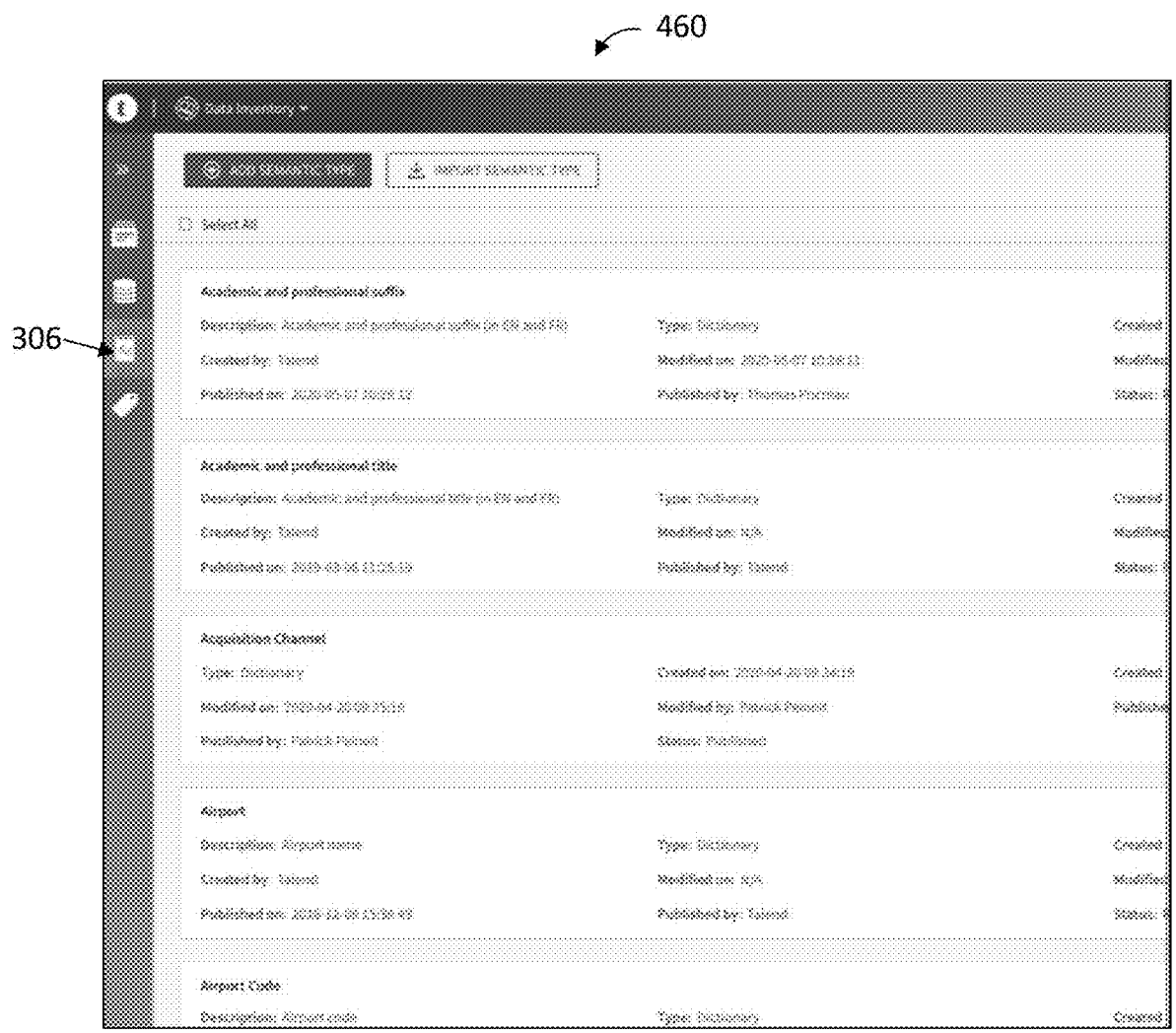
FIG. 4D illustrates an example user interface according to one embodiment of the present disclosure.

FIG. 4D illustrates an example user interface 460 according to one embodiment of the present disclosure. A user interface 460 provides selectable functionality for adding one or more semantic types to a dataset(s) in the dataset inventory. In various embodiments, the user interface 460 provides selectable functionality for creating one or more semantic types. For example, a user account can create a dictionary semantic type for airport names. When a user account selects the airport dictionary semantic type to be applied to one or more datasets in the dataset inventory, the Trust Score Engine may determine data values stored in the datasets that qualify as data types listed in the dictionary semantic type.

Custom Attributes User Interface

Figure 4E:
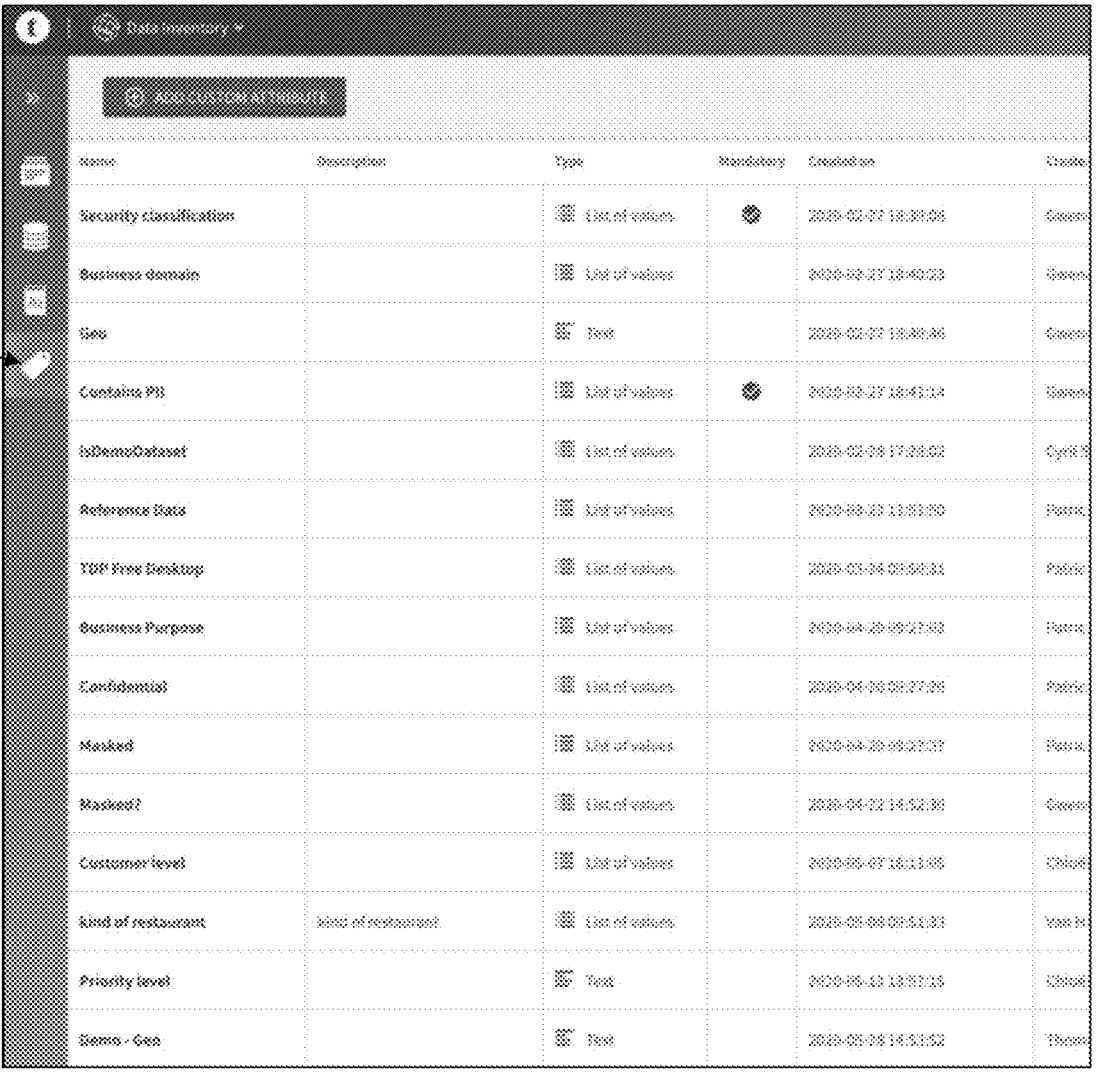
FIG. 4E illustrates an example user interface according to one embodiment of the present disclosure.

FIG. 4E illustrates an example user interface 480 according to one embodiment of the present disclosure. A user interface 480 provides selectable functionality for adding one or more custom attributes to a dataset(s) in the dataset inventory. A custom attribute may be selected from a set of pre-defined rules to be associated with a dataset(s). For example, a custom attribute may be metadata applied to a dataset that makes a portion of the dataset searchable from the dataset inventory and/or sortable among other datasets in the dataset inventory.

Add Filter User Interface

Figure 4F:
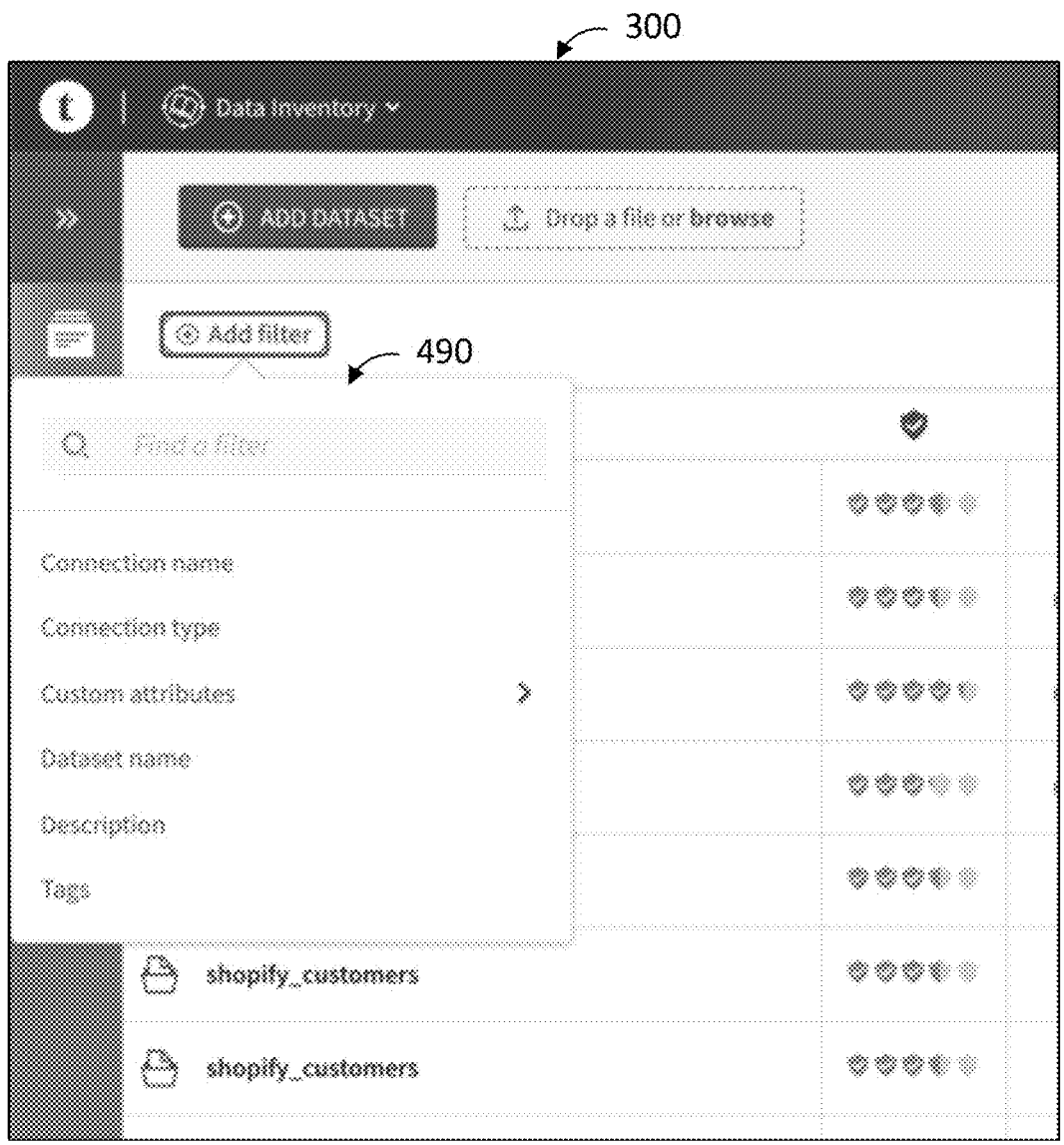
FIG. 4F illustrates an example user interface according to one embodiment of the present disclosure.

FIG. 4F illustrates an example user interface according to one embodiment of the present disclosure. The filter search interface 490 may be accessed via selection of an add filter functionality 340 at the dataset list view user interface 300. The filter search interface 490 provides filtering functionality for searching or limiting the datasets that are presented in the dataset list view user interface 300. The filter search interface 490 provides for filtering one or more datasets based on a connection name, connection type, custom attributes, dataset name, dataset description, and/or tags.

Dataset Detail User Interface

Figure 5A:
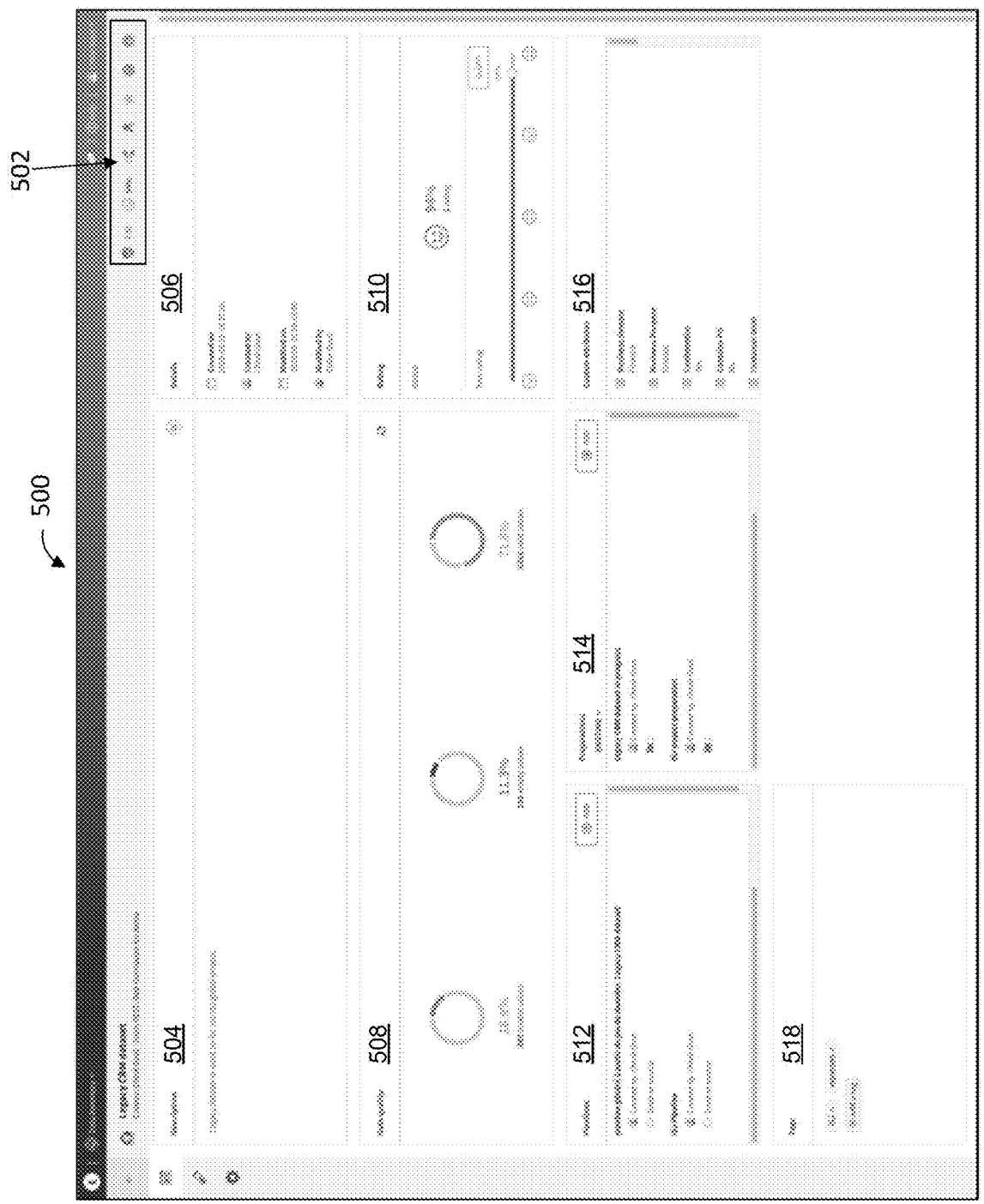
FIG. 5A illustrates an example user interface according to one embodiment of the present disclosure.

FIG. 5A illustrates an example user interface 500 according to one embodiment of the present disclosure. The user interface 500 may receive input or selections from a user (i.e. a user account) of various icons, graphical user interface controls, text and or other selections about the user interface 500. The user interface 500 displays different sections depicting information about a particular dataset. The user interface 500 displays a Dashboard section 502, a Description section 504, a Details section 506, a Data Quality section 508, a Rating section 510, a Pipelines section 512, a Preparations section 514, a Custom Attributes section 516, and a Tags section 518. FIGS. 5B-5G further illustrate these sections of the example user interface 500 of FIG. 5A.

User interface section 504 provides an input box where a user may enter a description of the particular dataset. The Trust Score Engine displays the description information when the user interface 500 is displayed for a particular dataset.

User interface section 506 displays information about the date/time and the user who dataset record was created, and information about the date/time and the user who last modified the dataset record. In the example section 506, the details information may be displayed as view only to the user without functionality to update information about the dataset record details.

Figure 5B:
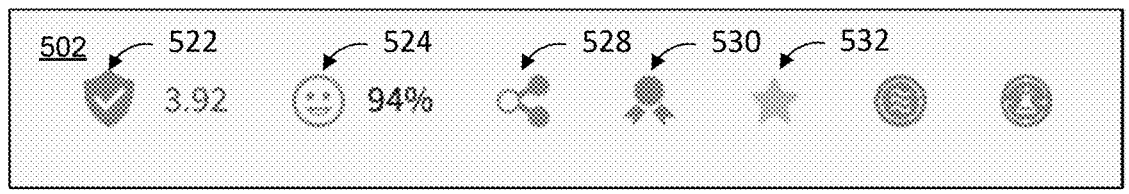
FIGS. 5B, 5C, 5D, 5E, 5F & 5G each illustrate portions (or sections) of the example user interface of FIG. 5A.

Referring to FIG. 5B, an example user interface according to one embodiment of the present disclosure is illustrated. FIG. 5B depicts the Dashboard section 502 of the user interface 500 as depicted in FIG. 5A. The Dashboard section 502 displays information about the dataset in an easily understandable manner. This Dashboard section 502 displays multiple graphical icons 522, 524, 528, 530, 532 that correspond to the list view information depicted in the user interface 300 of FIG. 300. Graphical icon 522 corresponds to column 322, graphical icon 524 corresponds to column 324, graphical icon 528 corresponds to column 328, graphical icon 530 corresponds to column 330, and graphical icon 532 corresponds to column 332.

Graphical icon 522 represents a data quality trust score for the particular dataset. In the example embodiment, the data quality trust score is a numeric value in a range of zero to five. In the example, the Trust Score Engine has determined a data quality trust score for the particular dataset as a value of 3.92. A higher data quality trust score indicates that the dataset is of a higher quality and may be trusted for usage, whereas lower data quality trust score indicates that the dataset is of a lower quality and may be suspect for usage.

Figure 7:
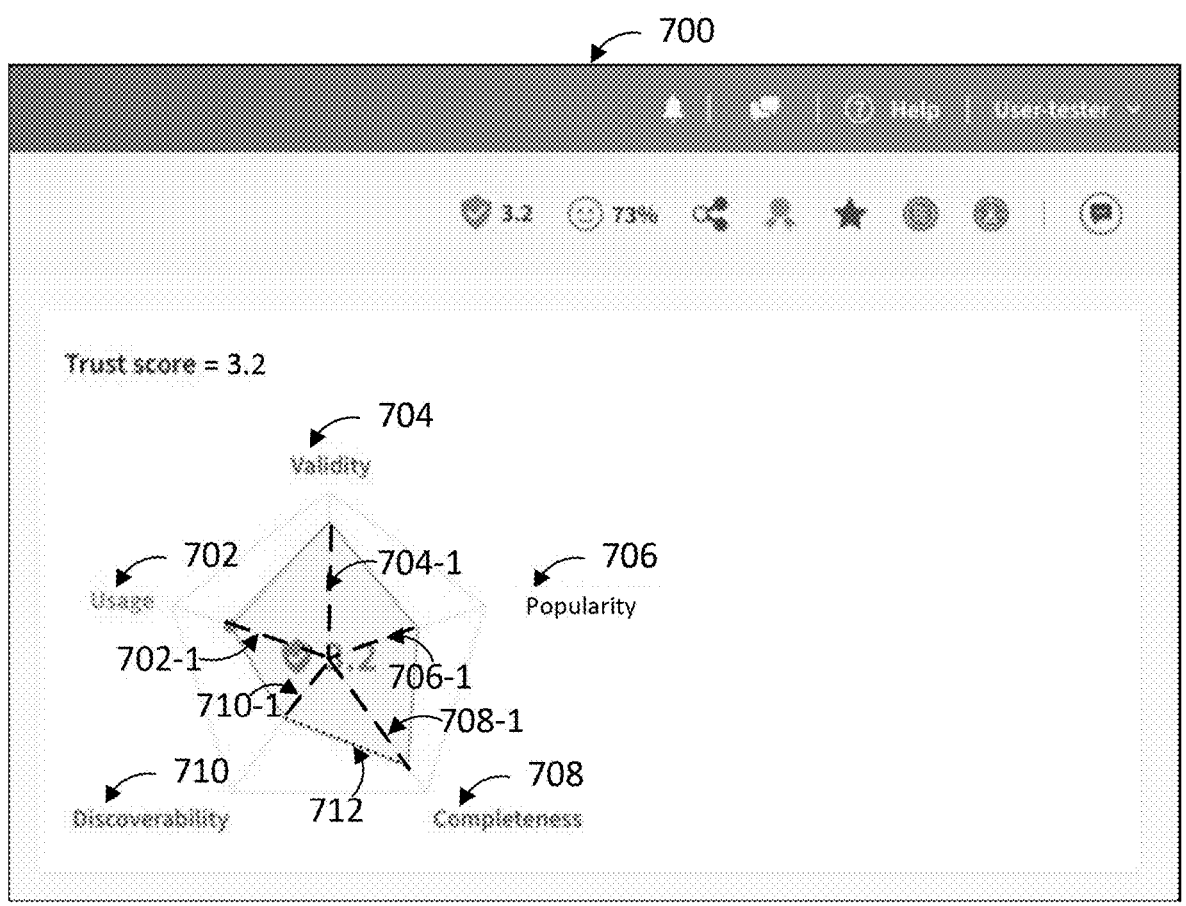
FIG. 7 illustrates an example user interface according to one embodiment of the present disclosure.

In response to receiving a selection of the graphical icon 522 (e.g., receiving a mouse double click command, or a double tap via a touch device), the Trust Score Engine may display a user interface for displaying a trust score for the particular dataset. An example interface depicting the trust score is illustrated in FIG. 7.

Graphical icon 524 represents a popularity value for the particular dataset. In the example embodiment, the popularity value is an aggregate, mean or weighted data quality score as annotated by one or more users. In the example, the system 100 has determined a data quality score (i.e., a popularity value) of 94% on a scale of 0-100%. Stated differently, the popularity value may be a numeric value that represents an aggregate of subjective determinations submitted by one or more users of the quality and trustworthiness of the dataset based on their respective experiences utilizing the dataset.

Graphical icon 528 represents an indication of whether the particular dataset has been shared with other users. For example, the Trust Score Engine may display the icon 528 in one color to show that the dataset has been shared, and another different color to indicate that the dataset has not been shared with other users. Moreover, user interface section 502 may depict a numerical value on or about the graphical icon 524 indicating a number of users to whom the dataset had been shared.

Graphical icon 530 represents whether the dataset has been certified or endorsed by a user. For example, a user may be assigned a profile as an owner of a dataset. Being a dataset owner may provide the user with one or more permissions and administration policies that other users cannot access. The owner-user may elect to apply a certification label to the dataset. Certification indicates the owner-user may control and grant which other users or how many other users can access, utilize and/or modify the certified dataset. Graphical icon 532 represents whether the dataset has been marked as a favorite for a user.

In response to receiving a selection of the graphical icon 528 (e.g., receiving a mouse double click command, or a double tap via a touch device), the Trust Score Engine may display a user interface for sharing the dataset with particular users and/or groups of users. The added users may be assigned a profile such as viewer, editor or owner of the dataset. A user may share the dataset with another user, multiple users and/or a user group.

Figure 5C:
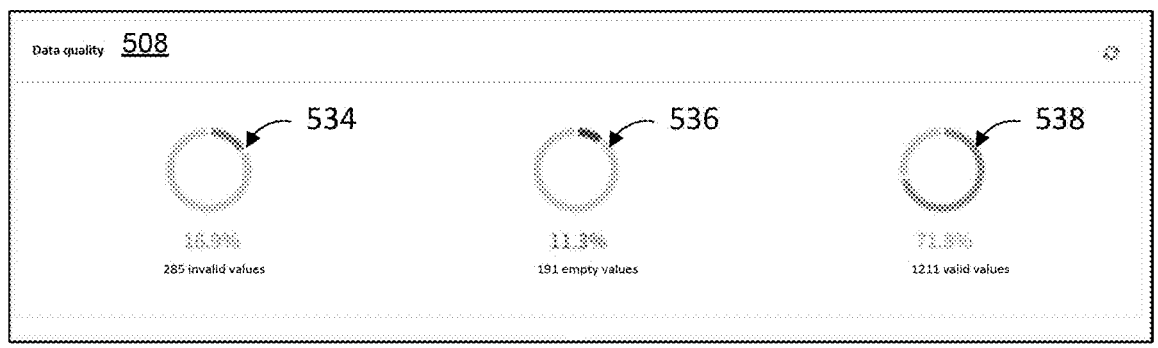

Referring to FIG. 5C, an example user interface section 508 according to one embodiment of the present disclosure is illustrated. FIG. 5C depicts the Data Quality section 508 of the user interface 500 as depicted in FIG. 5A. This user interface section 508 displays data quality information for the particular data. The section 508 displays a graphical representation of the percentage of the records of the dataset that have invalid values 534, that have empty values 536, and that have valid values 538. For example, the dataset has 1,687 records, of these records 16.9% of dataset records have invalid values (i.e., 285 records), 11.3% of the dataset records have empty values (i.e., 191 records), and 71.8% of the dataset records have valid values (i.e., 1211 records). These values provide data quality information about the dataset. The data quality of section 508 corresponds to column 326 of the of the user interface 300 of FIG. 3.

As will be described below, by providing the functionality for allowing multiple users of a dataset to provide their own evaluation of the data quality of the dataset, the Trust Score Engine may use this information as one parameter to assess an overall data quality score. The aggregate data quality information added by multiple users as to a particular dataset may be referred to as a type of social curation by users.

Figure 5D:
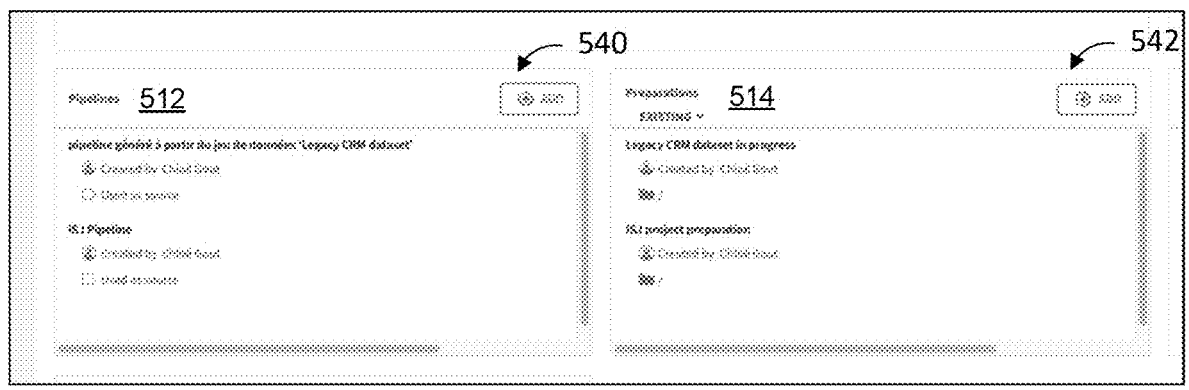

Referring to FIG. 5D, an example user interface according to one embodiment of the present disclosure is illustrated. FIG. 5D depicts the Pipelines section 512 and the Preparations section 514 of the user interface 500 as depicted in FIG. 5A. Section 512 provides functionality for accessing a data integration development environment. Section 514 provides functionality for accessing a data preparation tool for reformatting data, correcting data and/or combining datasets to generate enriched dataset output.

Figure 5E:
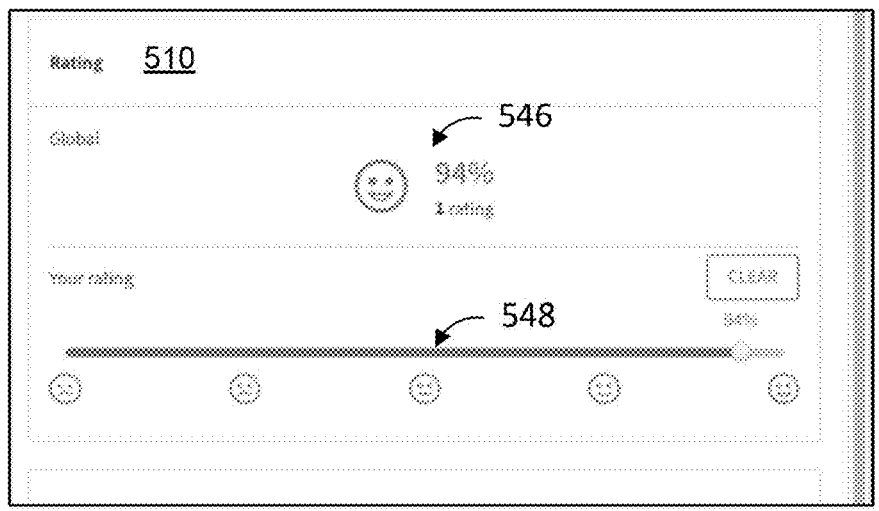

Referring to FIG. 5E, an example user interface according to one embodiment of the present disclosure is illustrated. FIG. 5E depicts the Ratings section 508 of the user interface 500 as depicted in FIG. 5A. User interface section 510 allows a user to rate their perceived (i.e. subjective) determination of the data quality of the dataset. Section 510 displays an individual selectable (and modifiable) rating 548 related to the particular user viewing the detail view of the dataset. The Trust Score Engine allows for multiple users to rate the quality of a particular dataset. In the example section 510, a graphical slide bar 548 is presented to a user via the user interface 500. The user interface may receive a selection for a data quality rating of the particular dataset. The system 100 then stores the selected rating value in a database associating the value with the particular dataset. Any suitable rating values may be used such as, for example, a percentage scale of 0-100%.

Section 510 also displays a global ratings value 546. The Trust Score Engine determines a value for the number of users that have provided an individual rating for the particular dataset. The system 100 also determines a mean or weighted average for a data quality rating based on the determined value of the number of users, and an aggregate score of the individual ratings. In the example, one user is shown as having rated the dataset with a data quality rating. The global percentage data quality rating is shown as 94%. If another two users had annotated the particular dataset with their respective data quality rating scores 90% and 82%, then for the global ratings 546 the Trust Score Engine may display a value of 3 for the number of users rating the dataset. Additionally, the system 100 may determine a mean global rating by summing the values for each data quality ratings and dividing by the number of users providing the data quality ratings (e.g., 94+90+82=266/3 users=88.67 or 88.67%).

Figure 5F:
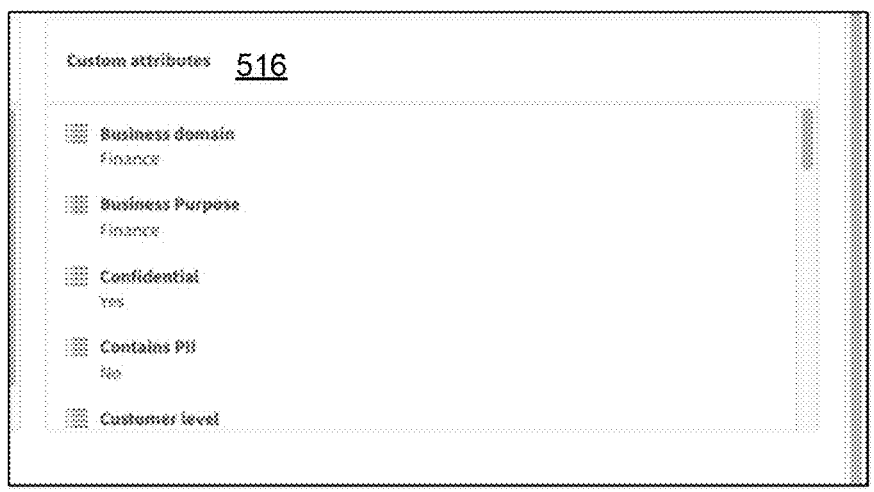
Figure 5G:
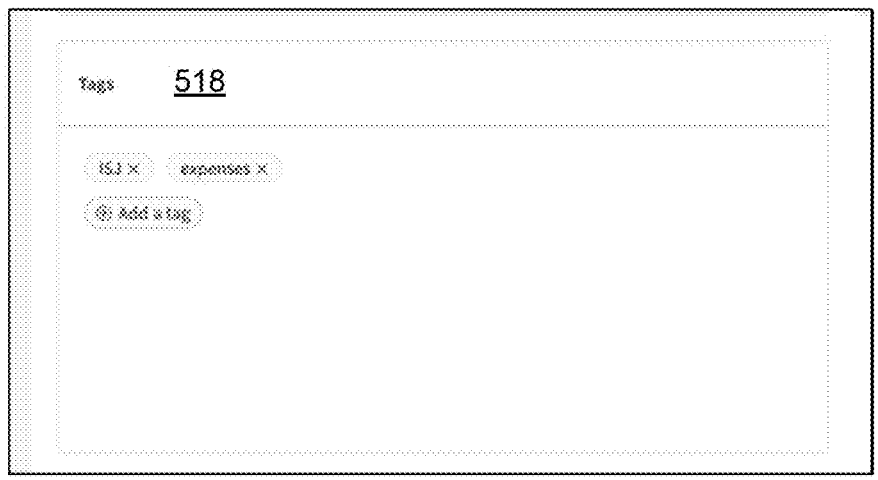

Referring to FIG. 5F, an example user interface according to one embodiment of the present disclosure is illustrated. FIG. 5F depicts the Custom Attributes section 516 of the user interface 500 as depicted in FIG. 5A. This section 510 displays a listing of the custom attributes as added to the particular dataset via the user interface 480 of FIG. 4E. Referring to FIG. 5G, an example user interface according to one embodiment of the present disclosure is illustrated. FIG. 5G depicts the Tags section 508 of the user interface 500 as depicted in FIG. 5A. This section 508 of the user interface may receive tags (e.g., textual labels, categories or identifiers) about the particular dataset. Section 508 may receive user selection or input of tags data and store in a database the tags data in association with the particular dataset.

Data Trust Score Determination Process

As shown in flowchart 600 of FIG. 6, the Trust Score Engine provides a user interface for identifying multiple, datasets collected into a dataset inventory, wherein the dataset inventory may be displayed within the user interface (Act 610). The Trust Score Engine determines social curation activities by respective user accounts that have been applied to one or more of the datasets in the dataset inventory (Act 620). The Trust Score Engine determines various types of social curation activities applied to a dataset by a plurality of user accounts within a common organization that provides access to the dataset inventory. According to various embodiments, the various types of social curation activities include, but are not limited to: a user account(s) selecting a ratings level for the dataset, a user account indicating certification of the dataset, indicating the dataset as a favorite, and occurrences of sharing the dataset between user accounts.

The Trust Score Engine validates one or more of the datasets in the dataset inventory according to one or more pre-defined attributes applied to one or more respective datasets (Act 630). For example, the Trust Score Engine validates a respective dataset according to one or more types of custom attributes selected for the respective dataset from a set of pre-defined rules. In various embodiments, a selected custom attribute may be searchable and sortable metadata associated with the respective dataset. The Trust Score Engine may also validate the respective dataset according to one or more semantic types associated with the respective dataset.

The Trust Score Engine generates a first trust score for a first dataset according to any determined social curation activities and any pre-defined attributes that correspond to the first dataset (Act 640). It is understood that a trust score may be generated for each dataset in a dataset inventory. A respective trust score may be a value calculated according to weighted categories that correspond to characteristics of a dataset. Such weighted categories include, but are not limited to: dataset completeness, dataset validity, dataset discoverability, dataset usage and dataset popularity. For example, dataset completeness may be a value that is based on occurrences of empty data cells and/or null values in a dataset. Dataset validity may be a value that is based on one or more semantic types applied to the dataset. Dataset discoverability may be a value that is based on an amount (and type) of tags applied to the dataset, one or more custom attributes selected for the dataset and/or strings and keywords in a user-created description of the dataset. Dataset usage may be a value that is based on an amount of users accessing the dataset during a particular time range. Dataset usage may also reflect the various ways respective users utilized the dataset. Popularity may be a value that is based on one or more ratings selected by users for the dataset and/or the types of ratings that were selected, whether the dataset has been certified, and/or the number and extent of users to whom the dataset was shared. Respective values for the categories may continuously change in response to a change in values of the dataset, added or deleted tags, added or deleted custom attributes, an updated description and/or new or revised user ratings. As such, the trust score is a dynamic value. For example, the Data Trust Score Engine may determine the first trust score whenever the dataset set information is loaded into the user interface.

According to various embodiments, the Trust Score Engine calculates the first trust score based on functionalities applied to data stored in the dataset. One or more functionalities may be applied to a dataset via a data integration development environment (i.e. data pipeline environment) and/or a data preparation tool. Such applied functionalities may be associated with one or more numeric values that may be accounted for during calculations of the trust score.

The Trust Score Engine receives a selection of a trust score visualization functionality, via the user interface, with respect to the first dataset. According to various embodiments the score visualization functionality triggers, upon selection, generation of a visualization of an extent that any determined social curation activities and any pre-defined attributes that correspond to the first dataset effect a value of the first trust score (Act 650), as further discussed with respect to FIG. 7.

Data Trust Score User Interface

As shown in FIG. 7, the Trust Score Engine displays a user interface 700 that may be rendered and displayed in response to selection of a trust score visualization functionality. The user interface 700 depicts a trust score visualization with respect to various categories, where each category 702, 704, 706, 708, 710 corresponds to a particular displayed visual characteristic (such as an axis) 702-1, 704-1, 706-1, 708-1, 710-1 of a trust score visualization for a trust score of a particular dataset. In the example, the trust score (shown as a radar chart) comprises five categories 702, 704, 706, 708, 710 upon which the trust score value is based. While the example, depicts five categories 702, 704, 706, 708, 710, in other embodiments the trust score value may be determined based on more or fewer categories and/or other types of criteria.

As illustrated, the trust score may be based on a Usage category 702, a Validity category 704, a Popularity category 706, a Completeness category 708 and a Discoverability category. In various embodiments, one or more of the categories 702, 704, 706, 708, 710 may have a pre-defined weighting value that corresponds with a degree of importance the category has to a calculation of the trust score. Additionally, the trust score may be a quantitative numeric value based on the various categories. For example, the user interface depicts an example of a quantitative trust score value of 3.2 on a scale of 0-5.

For the Usage category 702, the Trust Score Engine may consider a count value for the number of number of pipelines and/or preparations applied to the dataset. Moreover, the Trust Score Engine may consider the number of updates of the dataset. For the Validity category 704, the Trust Score Engine may consider the number of semantic types and/or the number of primitive types added or associated with the particular dataset. For example, the semantic types may be added via the user interface 460 as depicted in FIG. 4D.

For the Popularity category 706, the Trust Score Engine may consider the number of user ratings added or annotated, whether or not the dataset was shared with other users and/or the number of users the dataset was shared with, and whether the dataset was certified or not by a user. The Popularity axis 706-1 indicates how a particular dataset is rated and shared by users across an organization, and also takes into account a certification level of the dataset.

For the Completeness category 708, the Trust Score Engine may evaluate the number of empty cells of the particular dataset. For example, the system 100 may consider the number of empty cells as depicted in section 508 of FIG. 5C.

For the Discoverability category 710, the Trust Score Engine may evaluate the number of tags and the number of custom attributes (as depicted in section 518 and section 516 of FIG. 5A) that have been added or annotated to a particular dataset. The Discoverability axis 710-1 indicates to what extent a particular dataset may be searched (i.e., discovered) based on the metadata associated with the dataset. Custom attributes may be added to a dataset to include metadata information to be used for searching and sorting of datasets. For example, the Trust Score Engine may consider (or account for) the number of tags and apply a weight (0 tags, 1-2 tags, 3-5 tags, >5 tags) during calculation of the trust score. The Trust Score Engine may consider Yes or No (i.e. true or false) as whether one or more custom attributes were added by a user (i.e. one or more user accounts).

As further shown in FIG. 7, each visual characteristic (e.g. axis) 702-1, 704-1, 706-1, 708-1, 710-1 of the trust score visualization represents an effect a corresponding category 702, 704, 706, 708, 710 has on the value of the trust score. For example, the axis 704-1 for the validity category 704 and the axis 708-1 for the completeness category 708 each have longer lengths than the other axes 702-1, 706-1, 710-1 for the other categories 702, 706, 710. As such, the respective longer lengths of each axis 704-1, 708-1 visually communicates that the validity and completeness categories 704, 708 currently have a greater effect on the value of the trust score than the other categories 702, 706, 710. In addition, the trust score visualization includes a visual effect (i.e. border 712) between end points of two axes 708-1, 710-1. The border 712 of the trust score visualization communicates a comparison between the completeness category 708 and the discoverability category 710 as to which of the two categories have a greater effect on the current value of the trust score. According to various embodiments, it is understood that the trust score visualization is not limited to visual characteristics consisting of axes and visual effects consisting of borders.

Data Trust Score Determination Computation

The Trust Score Engine may use different computations for determining a trust score value according to embodiments of the present disclosure. According to various embodiments, the variables, calculations and steps for a trust score formula may be encoded onto a computer readable medium. The example formula is for illustrative purposes and may be modified according to a particular implementation of a Trust Score Engine. In the example of FIG. 7, a trust score may be determined by the Trust Score Engine based on five criteria Usage 702, Validity 704, Popularity 706, Completeness 708 and Discoverability 710.

The Trust Score Engine may determine the Usage 702 criteria based on an evaluation of whether and to the extent that the particular dataset is being used by users (e.g., user accounts) and/or other applications or systems. For example, the Trust Score Engine may determine a value for the Usage 702 criteria based on an amount of users accessing the dataset during a particular time range, the number of other applications and/or systems using the dataset. Dataset usage may also reflect the various ways respective users utilized the dataset. In one embodiment, the Trust Score Engine may determine a Usage 702 criteria value of 0 to 1 for use as a parameter in the calculation of the trust score.

The Trust Score Engine may determine the Validity 704 criteria based on the extent to which one or more semantic types have been applied or associated to the dataset. For the Validity 704 criteria, the Trust Score Engine takes into account the number of valid and invalid values across a dataset. For example, a user may add semantic types via the user interface 460 of FIG. 4D. The Trust Score Engine may determine a value based on the number or ratio of semantic type that are associated with the dataset. In one embodiment, the Trust Score Engine may determine a Validity 704 criteria value of 0 to 1 for use as a parameter in the calculation of the trust score.

The Trust Score Engine may determine the Popularity 706 criteria based on the evaluation of the whether a particular dataset has been certified, the number of user accounts having rated the dataset and the ratings provided by the respective users and/or the sharing of the dataset to one or more user accounts.

A user (such as an owner of a dataset) may indicate that the dataset is certified by selecting the certification icon (as shown in FIG. 5B, icon 530). In one embodiment, the system may store different certification levels (e.g., no certification, pending certification, approved certification). This certification icon may be stored as a boolean flag as 0 (i.e., false) or 1 (i.e., true) to indicate whether the dataset has been certified. The value of 0 would indicate that the dataset has no certification. The value of 0 would be set as a default value when the dataset is added to the dataset inventory. To indicate certification of the dataset, a user may select the certification icon which would change the value to true, and would change the certification icon to an enabled state indicated by another color (such as green) from a default color of gray. Additionally, the system may store another value, such as 2, to indicate that a certification is pending.

Additionally, the Trust Score Engine may determine the number of users that have rated the dataset and the respective ratings of the users. For example, as discussed previously with regard to FIG. 5E, no users to one or more users may provide a rating as to the dataset. The Trust Score Engine may evaluate the total number of user accounts and the rating values of their respective ratings (e.g., rating based on a scale of 0-100).

Also, the Trust Score Engine may evaluate the number of users that the dataset has been shared to. Icon 528 of FIG. 5B represents whether the dataset has been shared with other user accounts. A user may share a data set with a single user and/or multiple users or a group of users. In determining the trust score, the Trust Score Engine may weight higher dataset sharing with groups of users more than dataset sharing with single users.

Taken together the Trust Score Engine may calculate a Popularity criteria value to be used for the trust score by taking into consideration whether the dataset has been certified (e.g., no certification, pending certification or approved certification), the number of users rating the dataset and the respective user ratings and the extent that the dataset has been shared with users. The Trust Score Engine may determine a Popularity criteria value based on a combination of values of the forgoing criteria. In one embodiment, the Trust Score Engine may determine a Popularity 704 criteria value of 0 to 1 for use as a parameter in the calculation of the trust score.

Trust Score Engine may determine the Completeness 708 criteria based on an evaluation of the data content of a particular dataset. For example, the Trust Score Engine may assess or examine the actual values of data in the fields of the dataset (e.g., as shown in FIG. 5C as to data quality) to determine the number of invalid values, empty values and valid values of fields of the dataset. An invalid value may be a value that is an unacceptable value for a field of the dataset and/or an improper data content for a field of the dataset. A valid value is a value that is an acceptable value for the field of the dataset and/or proper data content for the field dataset. An empty value is a field that does not have data for fields of the dataset. The Trust Score Engine may count the number of instances or occurrences of the invalid values, empty values and valid values. The Trust Score Engine may determine a value to be used in the trust score calculation for the Completeness 708 criteria valued to be used for calculation of the trust score by taking into consideration the ratio of invalid values, empty values and valid values of the dataset. In one embodiment, the Trust Score Engine may determine a Completeness 708 criteria value of 0 to 1 for use as a parameter in the calculation of the trust score.

The Trust Score Engine may determine the Discoverability 710 criteria based on the extent to which a particular dataset has been annotated with additional information thereby allowing better searching and discovery of the dataset and/or information content of the dataset. For example, the Trust Score Engine may determine a Discoverability 710 criteria value based on an amount (and type) of tags applied to the dataset, one or more custom attributes selected for the dataset and/or strings and keywords in a user-created description of the dataset. In one embodiment, the Trust Score Engine may determine a Discoverability 710 criteria value of 0 to 1 for use as a parameter in the calculation of the trust score.

The formula, calculation or computation used for determining a trust score may include one or more criteria relating to a dataset. Additionally, a weighting value may be applied to any of the trust score criteria. This weighting value may be modified via a user interface providing input for weighting of any of the trust score criteria. For example, the system may present a user interface where a user may select one or more criteria to be used in the computation of the trust score. Each of the criteria may be given a weighting value as to influence of the criteria as to the overall trust score.

Referring back to FIG. 7, each of the trust score criteria Usage 702, Validity 704, Popularity 706, Completeness 708 and Discoverability 710 may be independently selected to be used in the determination of the trust score computation. For instance, the data trust score may be determined based on a Popularity 706 criteria and Validity 704 criteria, or Usage 702 criteria, Validity 704 criteria and Popularity 706 criteria, or can be determined based on one criteria such as Popularity 706 criteria. While the five criteria may be used as parameters in a trust score computation, other criteria and factors related to the dataset may also be used in determining the trust score of the dataset.

In one embodiment, the Trust Score Engine may determine a data trust score value in a range of between 0-5, for example, by the following formula: $\Sigma$ (popularity criteria value+validity criteria value+usage criteria value+popularity criteria value+discoverability criteria value), where the popularity criteria value is in the range of 0-1, the validity criteria value is in the range of 0-1, the usage criteria value is in the range of 0-1, the popularity criteria value is in the range of 0-1, and the discoverability criteria value is in the range of 0-1). The range of values and the criteria used for a data trust score value computation may be modified as suitable for the particular implementation.

While the foregoing discusses the inventory of datasets and performing evaluation of dataset attributes and social curation activities, the process may be applied to other types of digital assets. For example, the system may allow for inventorying of application program interfaces, applications (API), computer programs, software, and other types of digital assets. These digital assets may be inventoried via a user interface and social curation activities may be applied to the digital asset.

Exemplary Computer System

Figure 8:
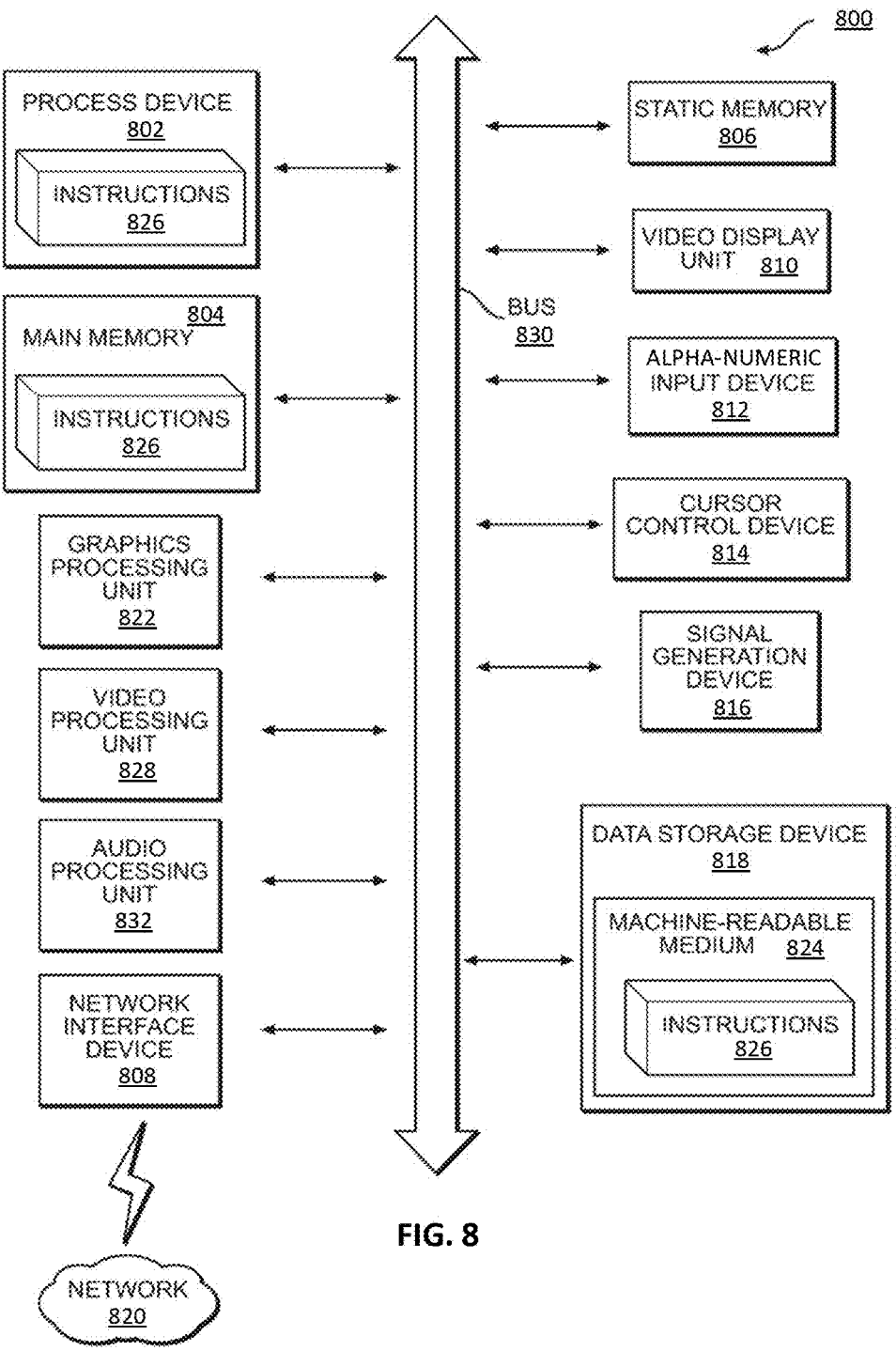
FIG. 8 is a diagram illustrating an exemplary environment in which some embodiments may operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to the components of a device to perform the disclosure herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A non-transitory computer-readable medium storing processor-executable instructions that, when executed by one or more processors, cause the one or more processors to:
output, at a user interface, a listing of a plurality of datasets, wherein each dataset of the plurality of datasets comprises a plurality of data records;
determine, for each dataset of the plurality of datasets, based on a quantity of invalid values or empty values for data records of that dataset, and based on a quantity of valid values for data records of that dataset, a ratio of invalid values and empty values to valid values;
determine, for each dataset of the plurality of datasets, based on the ratio of invalid values and empty values to valid values for that dataset, a data completeness value for a trust score associated with the listing of the plurality of datasets;
receive, via the user interface, one or more user-created semantic types for each dataset of the plurality of datasets;
determine, for each dataset of the plurality of datasets, based on a dictionary of semantic types, a quantity of one or more data values stored in one or more data records within the corresponding dataset that qualify as one or more user-created semantic types within the dictionary of semantic types, wherein the dictionary of semantic types comprises the one or more user-created semantic types;
determine, for each dataset of the plurality of datasets, based on the quantity of the one or more data values stored in the corresponding dataset that qualify as the one or more user-created semantic types within the dictionary of semantic types, a data validity value for the trust score;
determine, based on the data completeness value and the data validity value associated with each dataset of the plurality of datasets, and based on a first weight associated with data completeness and a second weight associated with data validity, the trust score; and output, via the user interface, a visualization of the trust score, wherein the visualization comprises a first axis associated with the first weight and a second axis associated with the second weight, and wherein the visualization indicates, based on the first axis and the second axis, that the first weight is greater than the second weight or the second weight is greater than the first weight.

2. The non-transitory computer-readable medium of claim 1, wherein the data completeness value for each dataset of the plurality of datasets is based on one or more of occurrences of empty data cells or occurrences of null values in the dataset.

3. The non-transitory computer-readable medium of claim 1, wherein the data validity value for each dataset of the plurality of datasets is based on the quantity of the one or more user-created semantic types associated with that dataset.

4. The non-transitory computer-readable medium of claim 1, wherein the processor-executable instructions further cause the one or more processors to:
   determine, based on one or more interactions with the user interface, the one or more user-created semantic types; and
   determine, based on the one or more user-created semantic types, the dictionary of semantic types.

5. The non-transitory computer-readable medium of claim 1, wherein an invalid value comprises a value that is an unacceptable value for a particular data record or field.

6. The non-transitory computer-readable medium of claim 5, wherein a valid value is a value that is an acceptable value for the particular data record or the field.

7. The non-transitory computer-readable medium of claim 1, wherein the first weight is greater than the second weight and the first axis comprises a size that is greater than a size of the second axis, or wherein the first weight is less than the second weight, and the first axis comprises a size that is less than a size of the second axis.

8. A method comprising:
   outputting, at a user interface, a listing of a plurality of datasets, wherein each dataset of the plurality of datasets comprises a plurality of data records;
   determining, for each dataset of the plurality of datasets, based on a quantity of invalid values or empty values for data records of that dataset, and based on a quantity of valid values for data records of that dataset, a ratio of invalid values and empty values to valid values;
   determining, for each dataset of the plurality of datasets, based on the ratio of invalid values and empty values to valid values for that dataset, a data completeness value for a trust score associated with the listing of the plurality of datasets;
   receiving, via the user interface, one or more user-created semantic types for each dataset of the plurality of datasets;
   determining, for each dataset of the plurality of datasets, based on a dictionary of semantic types, a quantity of one or more data values stored in one or more data records within the corresponding dataset that qualify as one or more user-created semantic types within the dictionary of semantic types, wherein the dictionary of semantic types comprises the one or more user-created semantic types,
   determining, for each dataset of the plurality of datasets, based on the quantity of the one or more data values stored in the corresponding dataset that qualify as the one or more user-created semantic types within the dictionary of semantic types, a data validity value for the trust score;
   determining, based on the data completeness value and the data validity value associated with each dataset of the plurality of datasets, and based on a first weight associated with data completeness and a second weight associated with data validity, the trust score; and
   outputting, via the user interface, a visualization of the trust score, wherein the visualization comprises a first axis associated with the first weight and a second axis associated with the second weight, and wherein the visualization indicates, based on the first axis and the second axis, that the first weight is greater than the second weight or the second weight is greater than the first weight.

9. The method of claim 8, wherein the data completeness value for each dataset of the plurality of datasets is based on one or more of occurrences of empty data cells or occurrences of null values in the dataset.

10. The method of claim 8, wherein the data validity value for each dataset of the plurality of datasets is based on the quantity of the one or more user-created semantic types associated with that dataset.

11. The method of claim 8, further comprising:
    determining, based on one or more interactions with the user interface, the one or more user-created semantic types; and
    determining, based on the one or more user-created semantic types, the dictionary of semantic types.

12. The method of claim 8, wherein an invalid value comprises a value that is an unacceptable value for a particular data record or field.

13. The method of claim 12, wherein a valid value is a value that is an acceptable value for the particular data record or the field.

14. The method of claim 11, wherein the first weight is greater than the second weight and the first axis comprises a size that is greater than a size of the second axis, or wherein the first weight is less than the second weight, and the first axis comprises a size that is less than a size of the second axis.

15. An apparatus comprising:
    one or more processors, and
    processor-executable instructions that, when executed by the one or more processors, cause the apparatus to:
    output, at a user interface, a listing of a plurality of datasets, wherein each dataset of the plurality of datasets comprises a plurality of data records;
    determine, for each dataset of the plurality of datasets, based on a quantity of invalid values or empty values for data records of that dataset, and based on a quantity of valid values for data records of that dataset, a ratio of invalid values and empty values to valid values;
    determine, for each dataset of the plurality of datasets, based on the ratio of invalid values and empty values to valid values for that dataset, a data completeness value for a trust score associated with the listing of the plurality of datasets;
    receive, via the user interface, one or more user-created semantic types for each dataset of the plurality of datasets;
    determine, for each dataset of the plurality of datasets, based on a dictionary of semantic types, a quantity of one or more data values stored in one or more data records within the corresponding dataset that qualify as one or more user-created semantic types within the dictionary of semantic types, wherein the dictionary of semantic types comprises the one or more user-created semantic types;

determine, for each dataset of the plurality of datasets, based on the quantity of the one or more data values stored in the corresponding dataset that qualify as the one or more user-created semantic types within the dictionary of semantic types, a data validity value for the trust score;

determine, based on the data completeness value and the data validity value associated with each dataset of the plurality of datasets, and based on a first weight associated with data completeness and a second weight associated with data validity, the trust score; and output, via the user interface, a visualization of the trust score, wherein the visualization comprises a first axis associated with the first weight and a second axis associated with the second weight, and wherein the visualization indicates, based on the first axis and the second axis, that the first weight is greater than the second weight or the second weight is greater than the first weight.

16. The apparatus of claim 15, wherein the data completeness value for each dataset of the plurality of datasets is based on one or more of occurrences of empty data cells or occurrences of null values in the dataset.

17. The apparatus of claim 15, wherein the data validity value for each dataset of the plurality of datasets is based on the quantity of the one or more user-created semantic types associated with that dataset.

18. The apparatus of claim 15, wherein the processor-executable instructions further cause the apparatus to:
   determine, based on one or more interactions with the user interface, the one or more user-created semantic types; and
   determine, based on the one or more user-created semantic types, the dictionary of semantic types.

19. The apparatus of claim 15, wherein an invalid value comprises a value that is an unacceptable value for a particular data record or field.

20. The apparatus of claim 19, wherein a valid value is a value that is an acceptable value for the particular data record or the field.

21. The apparatus of claim 15, wherein the first weight is greater than the second weight and the first axis comprises a size that is greater than a size of the second axis, or wherein the first weight is less than the second weight, and the first axis comprises a size that is less than a size of the second axis.

* * * * *